Nov. 10, 1931.  J. E. WILDER  1,831,772
GREEN PEA SHELLER
Filed June 12, 1930

Inventor
J. E. Wilder
By Charles W. Hills
Attorney

Patented Nov. 10, 1931

1,831,772

UNITED STATES PATENT OFFICE

JAMIE E. WILDER, OF RALEIGH, NORTH CAROLINA

GREEN PEA SHELLER

Application filed June 12, 1930. Serial No. 460,675.

My invention relates generally to pea shellers, and more particularly to a sheller for green peas of that type wherein the peas are fed between squeeze rolls, the peas falling to the near side of the rolls, and the shells passing through the rolls and being discharged therefrom. My primary object is the provision of a pea sheller of the above type in a construction and relative arrangement of parts by means of which the operator is permitted to easily and conveniently operate the shelling rolls, as well as feed the peas to the rolls, and the arrangement is furthermore such that the operation may be speedily accomplished and the final separation and clean-up quickly effected.

In the accompanying drawings, which illustrate my present invention and form a part of this specification:

Figure 4 is a vertical section through portions of the apparatus to be hereinafter specifically referred to.

Figure 1:
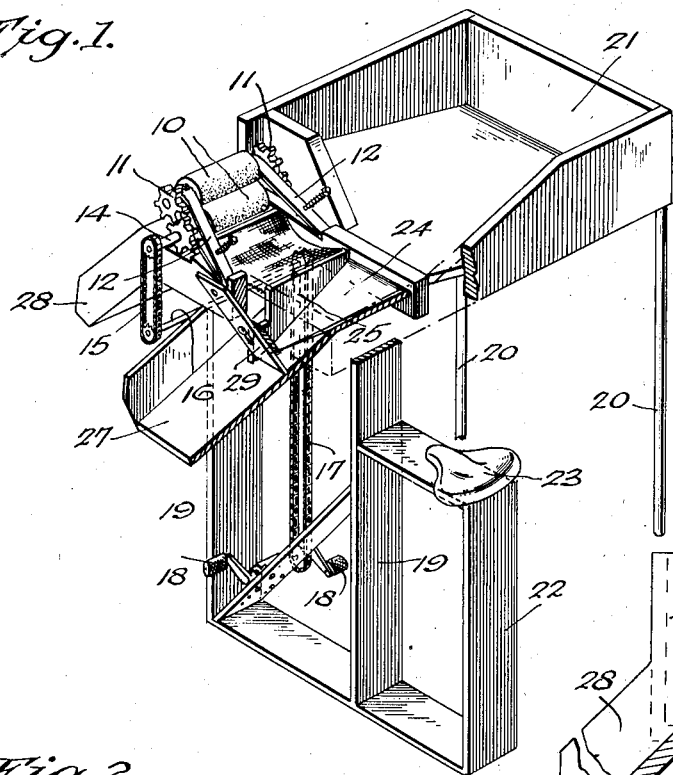
Figure 1 is a perspective view of my invention showing certain parts broken away and in section.

Referring to these figures, the two squeeze rolls 10 have intermeshing gears 11 and relatively soft surfaces and are supported in bearings at the ends of the bars 12, the uppermost bars of which are engaged by springs 13 so as to tension the rolls in their engaged relation. The lowermost roller has a laterally extended shaft 14 connected by sprocket wheels and a chain 15 to a countershaft 16, and this shaft is in turn connected by sprocket wheels and a chain 17 to a lower crank shaft, the cranks of which having pedals 18.

The above parts are supported in a frame including uprights 19 and legs 20, which also support an upper main or supply hopper 21 along one side of which the squeeze rolls 10 are disposed. The frame has a lateral extension 22 on which the operator's seat 23 is mounted, so that the operator can conveniently reach the pedals 18 and will, when seated, face the squeeze rolls and the feed hopper 24. This latter hopper has an inclined base, the inclination of which is away from the adjacent open side of the main or supply hopper 21, thus making it easy for the operator to reach with one hand into the main supply hopper and rake a supply of peas into the feed hopper 24 from which they are individually fed between the rolls.

Figure 4:
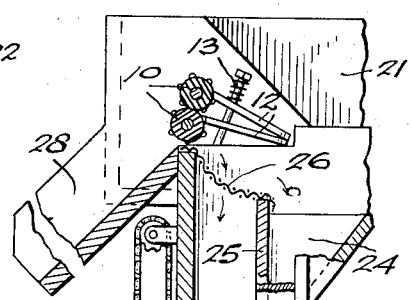
Figure 2:
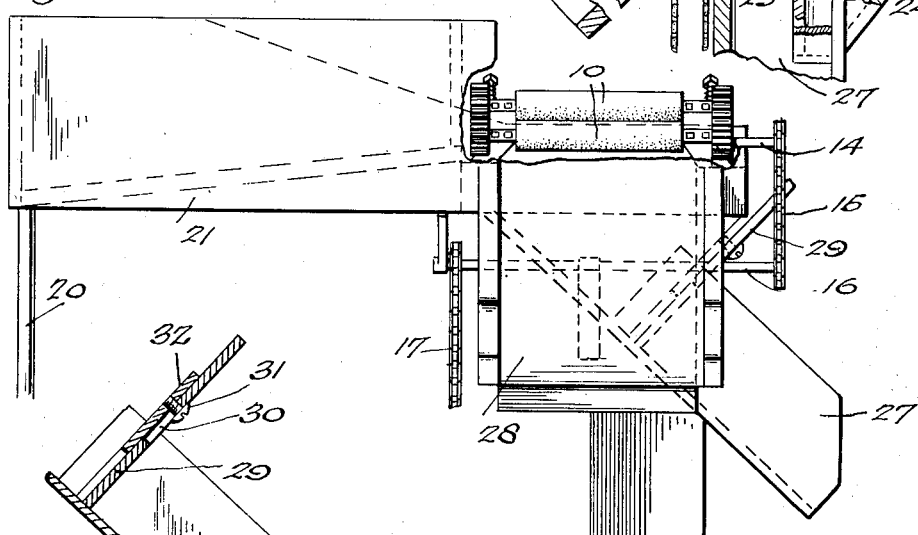
Figure 2 is a rear elevation, certain parts being broken away.

The feed hopper 24, located on the near side of the feed rolls, that is, between the latter and the operator's station, is disposed in a plane below that of the squeeze rolls, and between the inner wall 25 of this hopper, as shown best in Figure 4, and the feed roll is a curved and inclined screen 26 upon which the shelled peas fall from the squeeze rolls, the screen being such that the peas fall therethrough into the pea chute 27, downwardly upon which they travel into any suitable receptacle placed below the discharge end of the chute.

Figure 3:
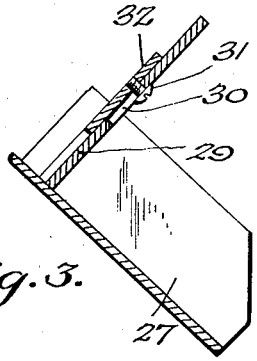
Figure 3 is a detail vertical longitudinal section through the pea chute at one side, or in line with the feed hopper.

The pea shells passing through the squeeze rolls 10 fall into a downwardly inclined shell discharge chute 28 and such portions of the shells as happen to fall upon the near side of the squeeze rolls, are caught by the screen 26 and may be readily brushed by the operator down this inclined screen into the feed hopper 24. In so doing some of the shelled peas are brushed into the feed hopper and in some instances peas fail to pass into the screen and run downwardly into the feed hopper. For this reason the pea chute 27 is extended beneath the feed hopper 24 and the lower end of the latter opens into the pea chute 27, although this opening is normally closed by a sliding closure plate 29, as seen in Figure 1, and more particularly in Figure 3. This closure plate 29 has a slot 30 through which a pin 31 is extended into a cross piece 32 at the lower end of the feed hopper 24, and it is obvious that whenever a supply of unshelled peas has been exhausted from the feed hopper 24, the operator may easily pick out pieces of shell and other débris and then by lifting the closure plate 29 such shelled peas as have run down or been brushed down the inclined screen 26 are thereupon permitted to run into the pea chute 27 and from the latter into the pea receptacle as if they had passed directly from the screen 26 into the chute. This makes for considerable convenience in the clean-up after exhausting each supply of unshelled peas from the feed hopper 24, and the operation as a whole is speeded up to a considerable extent in the long run by reason of such convenience.

It is obvious that with my improved apparatus, the operator seated on the seat 23 may easily reach into the main or supply hopper 21 in which the unshelled peas from the field are dumped, and from time to time rake a supply of peas into the feed hopper 24 so that the confusion of an over-supply of unshelled peas immediately in front of the operator is avoided. As he operates the foot pedals, and through the latter, the squeeze rolls 10, the operator is free to use one or both hands in the feeding of peas to the squeeze rolls, the peas as they are squeezed from the shells falling onto and through the screen 26 at the near side of the squeeze rolls without interfering with the feeding of the unshelled peas. It is an easy matter for the operator to brush into the feed hopper any peas or portions or shells falling onto but not passing through the screen 26, from time to time, thus keeping the screen clear so that the desired fall of peas therethrough into the pea chute 27 will not be retarded.

It is furthermore obvious, as before pointed out, that the provision for discharge of peas from the feed hopper directly into the pea chute by simply lifting the closure plate 29 promotes ready clean-up after the exhaustion of each batch of unshelled peas from the feed hopper 24.

What is claimed is:

A green pea sheller including shelling rolls, a screen inclined forwardly in advance of said rolls for the passage therethrough of shelled peas, an inclined discharge chute for shelled peas below said screen, a feed hopper arranged in advance of and below the forward end of the screen to receive portions of the shells and peas failing to pass through the screen, said feed hopper having an inclined base opening at its lower end for discharge into the said discharge chute, and a closure member for normally closing the lower discharge opening of the feed hopper as described.

In testimony whereof I hereunto affix my signature.

JAMIE E. WILDER.